July 8, 1930.  E. McKENNEY ET AL  1,770,040
ANTISKID DEVICE
Original Filed Jan. 15, 1927
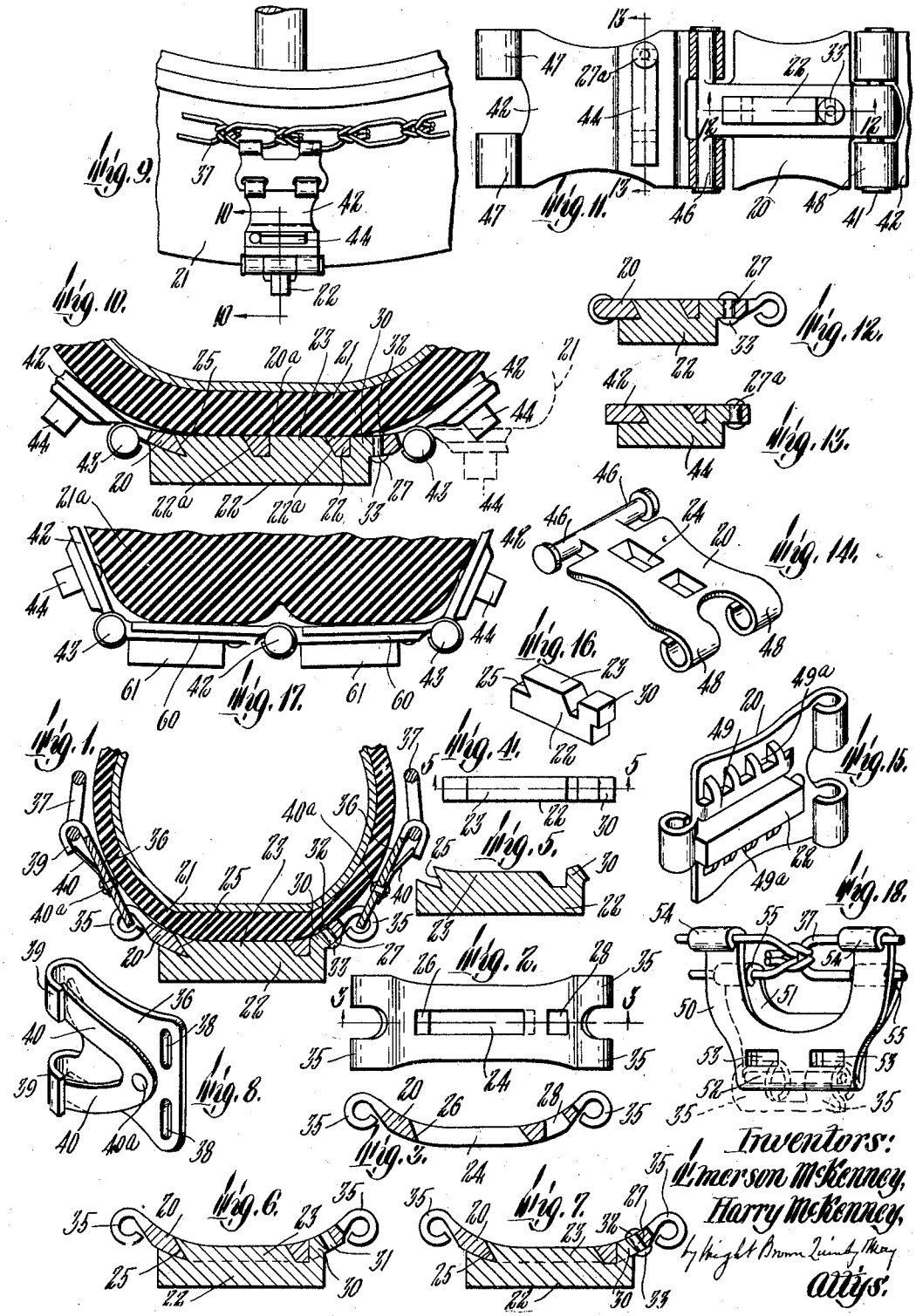
Inventors:
Emerson McKenney,
Harry McKenney, Patented July 8, 1930

1,770,040

UNITED STATES PATENT OFFICE

EMERSON McKENNEY AND HARRY McKENNEY, OF WAKEFIELD, MASSACHUSETTS, ASSIGNORS TO McKENNEY CHAIN CO., OF PORTLAND, MAINE, A CORPORATION OF MAINE

ANTISKID DEVICE

Application filed January 15, 1927, Serial No. 161,315. Renewed November 5, 1929.

The invention relates to an anti-skid device adapted for use with the rubber tire of a motor-vehicle wheel and with the usual annular side chains at opposite sides of the tire.

The invention is embodied in part in an anti-skid device comprising a central link formed to extend across the tread portion of the tire and having an inner face conforming to said portion, and a calk narrower than the link and projecting from the outer face thereof, and coupling links connecting the opposite ends of the link with adjacent links of the side chains, in such manner as to prevent tipping of the link and calk relative to the tire tread and maintain the calk firmly in its operative position.

The invention is embodied also in certain improvements in the construction of the central link and the calk whereby the calk is separably attached to the link in such manner as to prevent liability of accidental separation.

Of the accompanying drawings forming a part of this specification,—

Figure 1 includes a transverse section of a portion of an elastic tire, and shows in longitudinal section an anti-skid device embodying the invention, including but one element, composed of a shoe and a calk.

Figure 2 is a plan view of the central link shown by Figure 1, looking toward the inner side.

Figure 3 is a section on line 3—3 of Figure 2.

Figure 4 is an edge view of the calk shown by Figure 2, looking toward the inner edge.

Figure 5 is a section on line 5—5 of Figure 4.

Figure 6 shows in section the central link and calk assembled without the locking key hereinafter described.

Figure 7 is a view similar to Figure 8, showing the locking key applied.

Figure 8 shows in perspective one of the two coupling links shown by Figure 1, connecting the central link with the usual side chains at opposite sides of the tire.

Figure 9 is a fragmentary side view, showing a portion of a wheel felly, a portion of an elastic tire thereon, and an anti-skid device including a plurality of elements each composed of a central link and a calk.

Figure 10 is a fragmentary section on line 10—10 of Figure 9, and shows a balloon tire.

Figure 11 is a side view, showing two of the elements shown by Figures 9 and 10, looking toward the outer faces of said elements.

Figure 12 is a section on line 12—12 of Figure 11.

Figure 13 is a section on line 13—13 of Figure 11.

Figures 14 and 15 show in perspective coupling links having certain distinguishing details hereinafter described.

Figure 16 is a perspective view of one of the calks.

Figure 17 is a fragmentary section similar to Figure 10, and showing a modification.

Figure 18 shows in perspective a modified form of side chain-engaging coupling link.

The same reference characters indicate the same parts in all of the figures.

Our improved anti-skid device includes a central element comprising a central link 20, having an inner face formed to bear on the tread portion of an elastic tire 21, and a calk 22 projecting from the outer face of the link and having a shank 23, inserted in a slot 24, in the link. The link and shank are provided with interlocking members at one end of the slot, separably securing one end portion of the calk to the link. Said members are preferably embodied in an undercut end face 25 (Figure 5), forming one end of the shank 23, and a correspondingly formed end face 26 (Figure 3), forming an end wall of the slot. The shank is adapted to be moved obliquely into the slot and thus cause the interlocking of said faces as shown by Figures 6 and 7, the shank closely fitting the slot.

The central element includes also a locking key 27, (Figures 1 and 7), securing the opposite end of the calk to the central link, said key being preferably a rivet, inserted in another slot 28 (Figure 3), formed in the link. The end portion of the calk engaged by the key is preferably formed by a tongue 30, adapted to enter the slot and only partly fill the latter, so that a key-securing space 31 (Figure 6) is left in the slot in which the key is insertible. The key has a head 32 at one end, overlapping inner surface portions of the link and tongue, and a head 33 at its opposite end formed by upsetting the rivet after its insertion in the space 31, the head 33 overlapping outer surface portions of the link and key, as shown by Figure 7. Provision is thus made for rigidly securing the calk to the link, and for detaching the calk by rupturing the key, for example, by cutting off one of the heads thereof, to permit the removal of the key, the calk being freely removable when the key is removed. The calk cannot be accidentally detached because it is detachable only when one of the rivet heads is cut off. A worn calk may, therefore, be quickly removed, and another quickly substituted therefor.

In the preferred embodiment of the invention shown by Figures 1 to 7, the central link is adapted to extend across and conform to the tread portion of the tire, and is provided at each end with a pair of spaced apart coupling hooks 35, formed by bending relatively thin end portions of the link. With the hooks 35 are engaged two coupling links 36 (Figure 8), adapted to connect the link with the usual side chains 37. Each link coupling includes a plate, adapted to bear on side portions of the tire and is provided with spaced apart slots 38, at its inner end, engaged with the hooks 35, and spaced apart hooks 39, at its outer end adapted to engage two adjacent links of a side chain. The coupling links 36, therefore have elongated bearings on the side chains, and the ends of the central link have elongated bearings on the coupling links, these bearings maintaining the central link substantially at right angles with the tire tread, preventing the link from rolling or tipping on the tread. Each coupling link 36 includes also a pair of connected spring tongues 40, fixed at 40ª to the link, and bearing yieldingly on the chain-engaging hooks 39. Each coupling link therefore constitutes in effect, a pair of snap hooks.

In the embodiment shown by Figures 9, 10 and 11, the anti-skid device includes in addition to the central element, composed of the central link 20 and calk 22, connected as above described, and adapted to bear on the tread portion of the tire, end elements adapted to bear on side portions of the tire, as shown by Figure 10. In this embodiment, which is suitable for balloon tires, the central link 20 and calk 22 may be considerably elongated, and the link may be provided with a cross-bar 20ª occupying a notch 22ª in the shank portion of the calk to strengthen the connection between the elongated calk and the link.

The end elements include links 42, hinged to the opposite ends of the central link, and calks 44 engaged with the links 42 in the same way that the calk 22 is engaged with the shoe 20, shown by Figures 1 to 7. The calk 22 of the central link extending crosswise of the tread, is adapted to resist longitudinal skidding. The calks 44 of the end links extend substantially at right angles with the calk 22 and lengthwise of the side portion of the tire, so that they are adapted to resist side skidding, particularly when they are associated with a balloon tire, which may be understood to be the type of tire shown by Figure 10. The not uncommon flattening of the tread portion of a balloon tire, causes a displacement of the calks 44, as indicated by dotted lines in Figure 10, so that these calks resist side skidding.

The link 20, may be provided at one end with spaced apart trunnions 46 (Figure 14), adapted to engage hooks 47 on one of the links 42, and at its opposite end with hooks 48, adapted to engage trunnions on the other link 42.

Figure 15 shows a modified form of the link 20, the outer face of the shoe being provided with projecting ribs 49, having slots 49ª and forming thickened portions of the link, adapted by the slots to aid in resisting side skidding.

The central element bearing on the tread portion of the tire may be composed of two sections hinged together at 42, as shown by Figure 17, each section including a link 60 and a calk 61. This modification may be used with a truck tire designated by 21ª in Figure 17.

Figure 18 shows a different form of chain-engaging link, composed of a sheet metal plate, bent to form two arms 50 and 51, and a neck 52 connecting the arms. The plate is provided with spaced apart slots 53, adjacent the neck and adapted to receive the hooks 35 on the link 20. The outer ends of the arms have spaced apart hooks 54 and 55, adapted to engage the two side stretches of two adjacent links of a side chain 37, so that the stress of the anti-skid device on the chain is distributed and borne equally by the two side stretches. The side chains may therefore be made of smaller wire and add less weight to the wheel.

A calk constructed as shown and described, may be marketed as an article of manufacture, the construction of the calk and of the locking key 27 being such that the owner of the improved anti-skid device may readily remove a worn out calk and substitute a new one therefor.

Each of the illustrated embodiments of the invention comprises a central link formed to extend across the tread portion of a tire and having an inner face conforming to the tread portion, and a calk projecting from the outer face of the link midway between the longitudinal edges thereof. The calk extending parallel with the longitudinal edges of the link, and being much narrower than the link, so that the cross section of the link and calk is substantially T-shaped. The link and calk are, therefore, of minimum weight, and the calk is adapted to have an elongated bearing on the ground. The T-shape, however, renders the link and calk liable to tip on the tire tread. We prevent this by the improved means shown by connecting the opposite ends of the link with the side chains 37.

It will be seen that the end portions of the central link are provided with transverse hinge members, formed, for example, by the spaced apart hooks 35 (Figures 1, 2 and 3). The coupling links shown by Figures 1 and 8, and other figures, are provided with complemental hinge members at their inner ends, formed, for example, by the slots 38 (Figure 8) and engaged with the hinge members on the central link to form therewith elongated hinges which extend across the central link ends. The spaced apart hooks 39, formed on the outer ends of the coupling links and engageable with adjacent links of the side chains 37, have elongated bearings on the side chains, and the hinge members on the inner ends of the coupling links have correspondingly elongated bearings on the hinge members of the central link ends. Said elongated bearings cause the central link to bear firmly on the tire tread without being tipped by the leverage exerted by the calks thereon, when the outer edges of the calks strike the ground.

We claim:

For use with a rubber-tired vehicle wheel and annular side chains at opposite sides of the tire thereof, an anti-skid device comprising a central link formed to extend across the tread portion of the tire, and having an inner face conforming to said portion, and a calk narrower than the link and projecting from the outer face thereof midway between the longitudinal edges of the link, so that the cross section of the link and calk is T-shaped, the calk extending lengthwise of the link, and means for connecting the opposite ends of the central link with adjacent links of the side chains, to prevent tipping of the link and calk on the tire tread, said means including transverse hinge members formed on opposite ends of the central link and coupling links having complemental hinge members at their inner ends engaged with the central link hinge members and forming therewith elongated hinges which extend across the central link ends, the coupling links being provided at their outer ends with spaced apart hooks engageable with adjacent links of the side chains, the arrangement being such that the coupling links have elongated bearings on the side chains, and on the end portions of the central link, and confine the central link and calk against tipping movements relative to the tire tread.

In testimony whereof we have affixed our signatures.

EMERSON McKENNEY.
HARRY McKENNEY.